No. 747,438. PATENTED DEC. 22, 1903.
C. F. KAUL.
LID FOR STEAM COOKERS.
APPLICATION FILED FEB. 11, 1902.
NO MODEL.
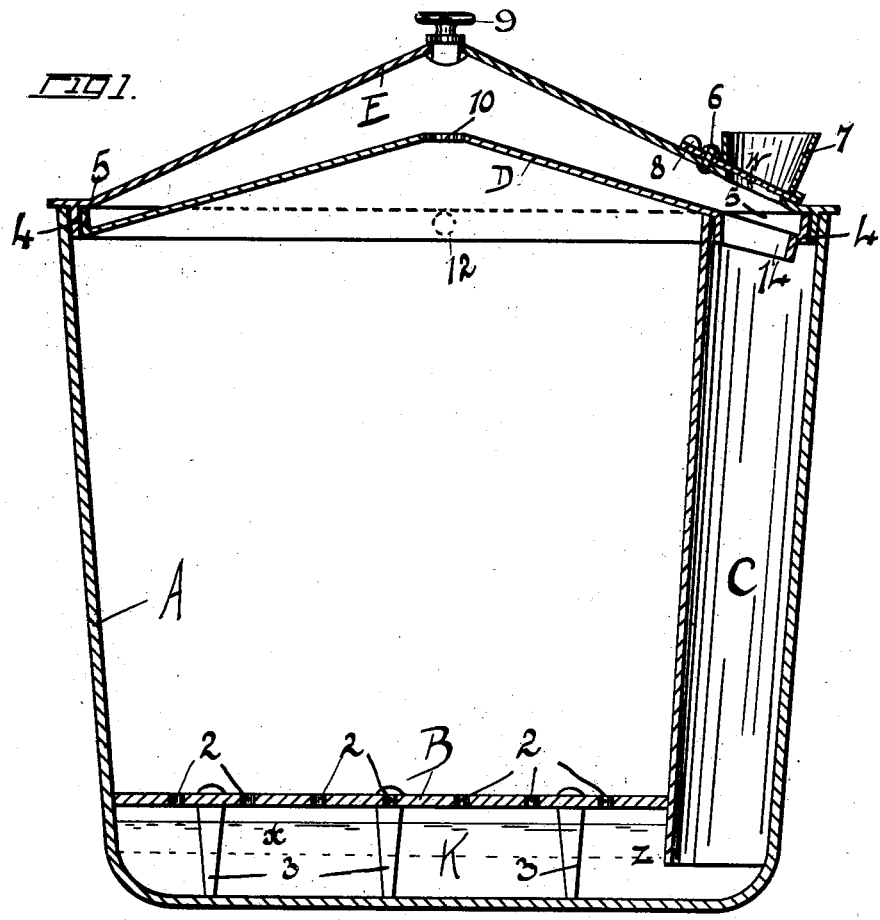
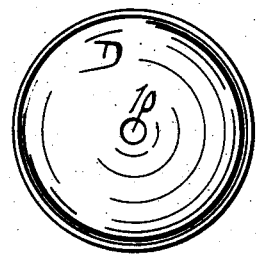
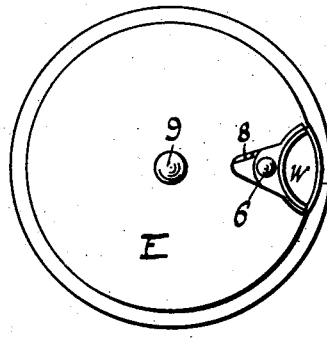
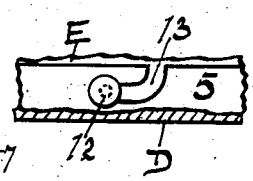
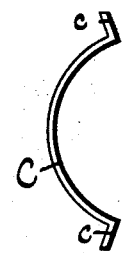
Witnesses:
F. J. Larson.
E. B. Maystrick.
Inventor:
Carl F. Kaul
per Geo. W. Sues.
Atty.

No. 747,438.

Patented December 22, 1903.

UNITED STATES PATENT OFFICE.

CARL F. KAUL, OF MADISON, NEBRASKA.

LID FOR STEAM-COOKERS.

SPECIFICATION forming part of Letters Patent No. 747,438, dated December 22, 1903.

Application filed February 11, 1902. Serial No. 93,506. (No model.)

*To all whom it may concern:*

Be it known that I, CARL F. KAUL, residing at Madison, in the county of Madison and State of Nebraska, have invented certain useful Improvements in Lids for Steam-Cookers; and I do hereby declare that the following is a full, clear, and exact description of the invention, such as will enable others skilled in the art to which it appertains to make and use the same, reference being had to the accompanying drawings, which form a part of this specification.

This invention relates to a new and improved lid for steam-cookers and dinner-pots.
The object of my invention is to provide a steam-cooker which shall be a heat economizer and in which will be insured a circulation of steam through the material being cooked.

In the accompanying drawings I have shown in Figure 1 a central sectional view of the steam-cooker embodying my invention. Fig. 2 shows a top view of the inner lid. Fig. 3 shows a view of the outer lid. Fig. 4 shows arrangement of the locking of the inner and outer lids, while Fig. 5 shows an end view of the spout used in my invention.

To an ordinary dinner-pot A is secured a suitable spout C upon the inside. This spout C is provided with the projecting flanges c, by means of which the spout is secured within the pot. It will be noticed that this spout terminates a suitable distance above the bottom of the pot. Positioned within this pot and a suitable distance above the lower end of the spout C is the perforate false bottom B, held by means of the supporting-legs 3. The spout C is securely fastened within the pot A, while the bottom B is removably mounted within the bottom of the pot. The spout C extends upward a suitable distance, though not quite to the top of the pot, as shown in Fig. 1.

Fitted within the top of the pot is the outer lid E, provided with the handle 9 and the opening *w*. Above this opening *w* is a pivoted lid 8 and above the lid the spout 7, a rivet 6 removably securing the lid 8 and spout 7. This outer lid E, it will be noticed, is in the shape of a hollow cone, the apex of which is centrally above the dinner-pot. This outer lid E is provided with the downwardly-extending flange 4, as shown. Removably secured to this outer lid E is an inner perforated lid D, the lid being secured by means of a pin 12, as shown in Fig. 4, which passes into a bayonet-slot 13 within the upwardly-extending flange 5 of the inner lid, as shown, so that these lids may be removed one from the other. This inner lid D is provided with a central opening 10 and with the downwardly-extending spout 14, emptying into the vertical spout C, as shown.

It will be noticed that the cone-shaped inner lid D is not quite as acute a cone as the outer lid, and between these two lids is formed a steam-jacket in communication with the bottom chamber K of the pot, formed by virtue of the false bottom B, as shown, the communication being effected through the spout C. By means of this arrangement the steam generates in the lower chamber K as it rises and is forced through the openings 2, passes through the materials being boiled, and escapes through the central opening 10 within the inner lid D. The steam then fills the upper space and finds an exit downward through the spout C to insure a circulation.

The device is neat and simple, and this two-part lid, the bottom, and spout C can be added to any suitable dinner-pot. In cooking the material in this pot the water is filled to a suitable point above the bottom of the spout C, as shown at the line *x*. The water should not fall below the bottom of the spout C or the height designated by the line *z* to produce the best results.

Having thus described my said invention, what I claim as new and novel, and desire to secure by United States Letters Patent, is—

1. In a steam-cooker, the combination with the body thereof having a spout arranged at its inner side, of a closure fitted upon said body and comprising cone-shaped inner and outer covers, the inner cover being of less pitch than the outer cover and having an opening at its apex and a downwardly-extending flanged spout adjacent to its edge fitted within the upper end of said spout to discharge the circulating steam into the latter, reversely-arranged flanges carried by said covers, one of said flanges fitting within and being embraced by the other flange, and separable means for locking said flanges together to maintain the same in engagement with each other.

2. In a steam-cooker, the combination with the body thereof having a spout arranged at its inner side, of a closure fitted upon said body and comprising cone-shaped inner and outer covers, the inner cover being of less pitch than the outer cover and having an opening at its apex and a downwardly-extending flanged spout adjacent to its edge fitted within the upper end of said spout to discharge the circulating steam into the latter, a downwardly-extending flange carried by the outer cover, an upwardly-extending flange carried by the inner cover and fitting within and embraced by the outer flange, one of said flanges having a bayonet-slot formed therein, and a pin carried by the other flange and engaging said slot to lock said flanges together to maintain the same in engagement with each other.

CARL F. KAUL.

In presence of—
EMILY B. MAYSTRICK,
FRED J. LARSON.